Figure 4:
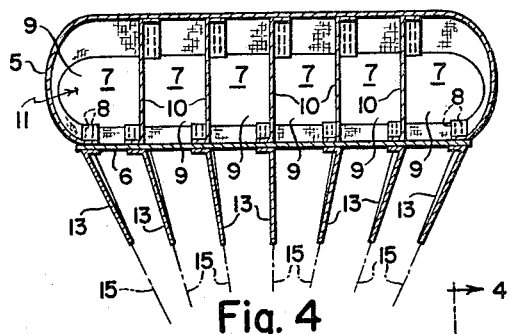

Nov. 15, 1966     D. C. JALBERT     3,285,546
MULTI-CELL WING TYPE AERIAL DEVICE
Filed Oct. 1, 1964     2 Sheets-Sheet 1

INVENTOR
DOMINA C. JALBERT

BY     *[signature]*
ATTORNEY

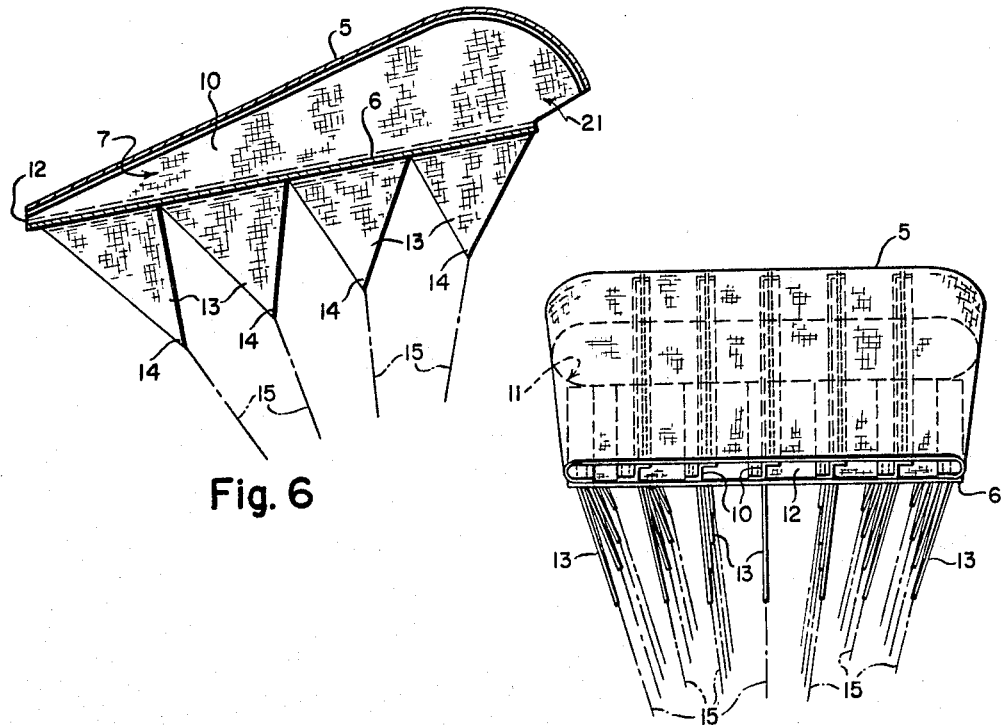
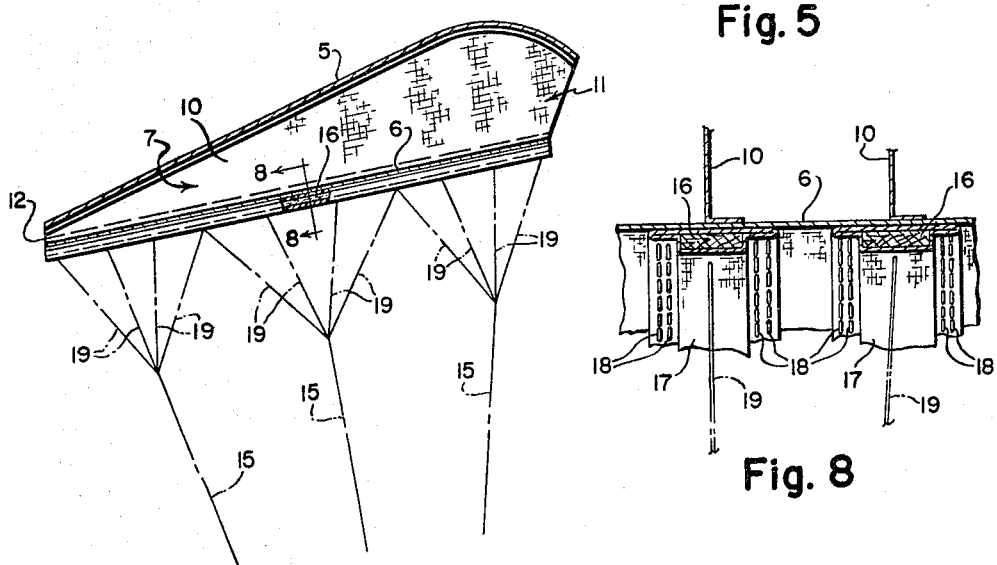

3,285,546
MULTI-CELL WING TYPE AERIAL DEVICE
Domina C. Jalbert, Boca Raton, Fla., assignor to Space Recovery Research Center, Inc., Palm Beach, Fla.
Filed Oct. 1, 1964, Ser. No. 400,734
8 Claims. (Cl. 244—145)

This invention relates to an aerial device based upon the principal of an airfoil or wing that can be utilized to suspend payloads in the atmosphere in captive flight or to recover payloads either manned or unmanned from space especially where controllability in flight is a requirement. It can also be used to stabilize objects in flight such as towed aerial targets, etc.

It is an object of the invention to provide a wing having a flexible canopy constituting an upper skin and with a plurality of longitudinally extending ribs forming in effect a wing corresponding to an airplane wing airfoil and with the ribs providing longitudinal channels for the flow of air from a relatively large opening on the front of the wing and a restricted opening upon the rear of the wing for the escape of air and with connecting means upon the lower skin to which shroud lines are connected and with the wing being generally rectangular or possibly a delta-shape or a T-shape in accordance with the particular use of the device.

More particularly the invention contemplates the provision of a wing of rectangular or other shape having a canopy or top skin and a lower spaced apart bottom skin and with the skins being disposed in equidistantly spaced relation to each other by ribs of a flexible nature that are fixed to the top and bottom skins and so shaped as to constitute an air foil and with the ribs constituting air channels having a relatively large opening upon the leading edge of the wing and a reduced opening at the rear edge of the wing for the escape of air passing through the channels and with wedge-shaped members connected to the bottom skin at spaced apart points and along the chords of the ribs to maintain stability in the wing and with the wedges at their lower points being connected to the several shroud lines normally employed in parachute construction and with the upper skin having marginal connection with the lower skin and with the wedges providing for even distribution of suspension pressure to permit the bottom sheet to retain a flat surface like an airplane wing.

The invention further contemplates a wing type device having the upper and lower skins and with the top and bottom skins or sheets covering the evenly spaced ribs to provide air flow channels and with the wing having a relatively large air opening at its leading edge and a reduced air escape opening at its trailing edge and with the lower skin along the chords of the ribs being connected to a plurality of flexible wedges that provide for even distribution of suspension pressure and with the wing, when employed as a free falling wing, the opening in the leading edge will be angled downwardly to more effectively cause the air to flow through the channels and with the flow of the air through the channels supplying rigidity to the wing whether the wing is to be used for captive flight or free drop. For a free drop, electronics devices can be installed to provide for remote control in the recovery of space items whatever they may be. The suspension lines can be attached to battens that are fixed to the underside of the lower skin and running along the same direction as the chord of the wing and by manipulating the rigid batten member, the attitude of the wing can be controlled.

With these and other objects to be hereinafter set forth in view, I have devised the arrangement of parts to be described and more particularly pointed out in the claims appended hereto.

Figure 1:
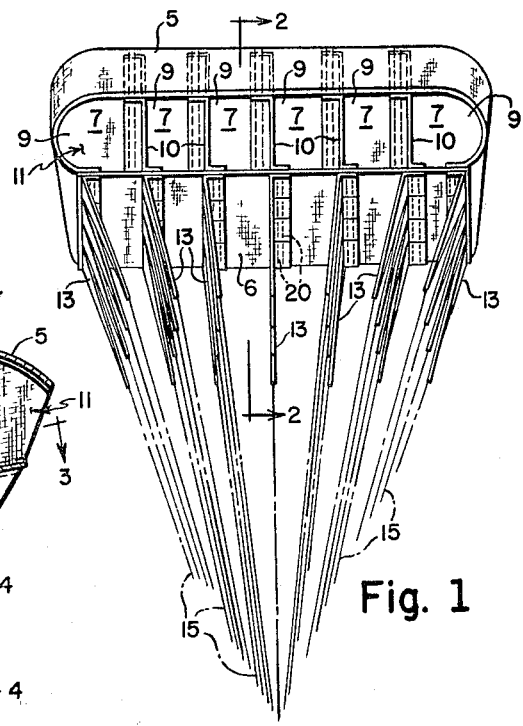
Figure 2:
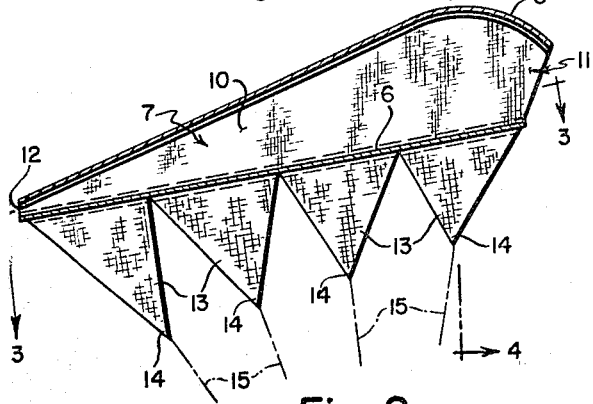
Figure 3:
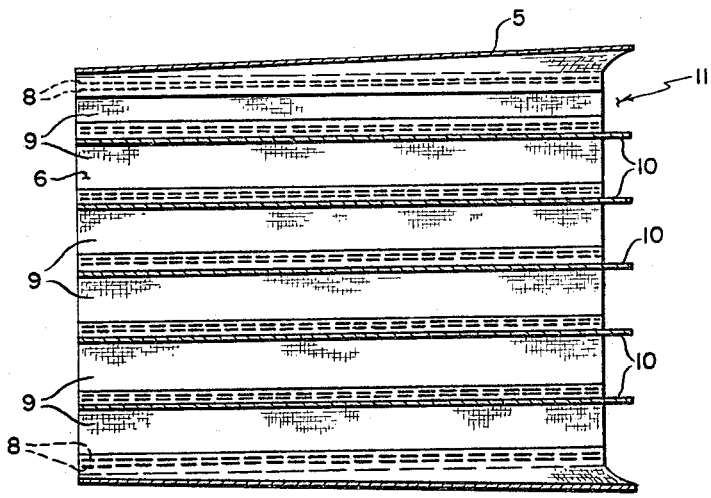

In the accompanying drawings:
FIGURE 1 is a front elevational view of the wing,
FIGURE 2 is a longitudinal section taken substantially on line 2—2 of FIGURE 1,
FIGURE 3 is a horizontal section taken substantially on line 3—3 of FIGURE 2,
FIGURE 4 is a transverse section taken substantially on line 4—4 of FIGURE 2,
FIGURE 5 is a rear elevational view of the wing,
FIGURE 6 is a longitudinal section similar to FIGURE 2 but illustrating a different angled air inlet opening at the leading end of the wing,
FIGURE 7 is a view similar to FIGURE 2 but illustrating a rigid batten upon the underside of the lower skin, and
FIGURE 8 is a fragmentary enlarged section taken substantially on line 8—8 of FIGURE 7.

Referring specifically to the drawings, there has been illustrated a flexible canopy top 5 and a bottom skin 6 that is spaced from the canopy 5 to constitute an air flow chamber 7. The marginal ends of the canopy 5 are stitched or otherwise connected to the skin 6, as indicated at 8. The chamber 7 is divided into a plurality of air flow channels 9, by a plurality of equidistantly spaced and preferably textile ribs 10, forming the air flow channels 9 and the ribs are shaped in accordance with the usual airfoil of an aircraft. The leading edge of the wing is provided for its full length with a relatively large air inlet 11 and a relatively small or restricted air outlet opening 12 is provided for the full width of the wing. The marginal edges of the ribs 10 are stitched or otherwise connected to the canopy 5 and to the lower skin 6 and with the skin 6 being substantially flat and with air pressure entering the opening 11, the wing assumes a shape similar to that illustrated in FIGURE 2.

Fixed to the underside of the skin 6, as by stitching or the like 12, are a plurality of depending preferably textile wedges 13. The wedges are preferably triangular in shape and their lower points 14 are connected to the well known shroud lines 15. The wedges are disposed along the chords of the ribs 10 and provide for even distribution of suspension pressure upon the wing to allow the bottom sheet or skin 6 to retain a flat surface like an airplane wing, while air pressure flowing through the channels 9 maintain the canopy 5 in extended direction to correspond to the airfoil of an aircraft wing for the wedges 13 are spaced in a manner to correspond with the ribs 10 and whereby an equal pressure is maintained upon the wing. The several wedges being illustrated in FIGURE 1 and in FIGURE 4.

In the use of the wing, as shown in FIGURES 1–5, air will flow through the slightly angled opening 11 to flow through the channels 9 and to have a retarded or limited escape through the opening 12, maintaining the canopy 5 in the predetermined shape illustrated.

In the form of the wing shown in FIGURE 6, the opening 11 is downwardly angled so that, as a free falling parachute, the opening 11 will scoop the air during the downward fall of the wing and also maintain the canopy and supply rigidity to the device. For a free drop, electronics devices may be installed in the wing to provide for remote control in the recovery of space items, whatever they may be. With respect to FIGURES 7 and 8, there has been provided a modified connecting means for the shroud lines 15, here comprising a relatively rigid batten 16 which may be a strip of relatively rigid wood, plastic or the like that extends through a preferably textile sleeve 17, having its marginal edges stitched at 18 to the underside of the skin 6. The battens are also disposed for the full width of the wing and along the chords of the ribs 10. The shroud lines 15 are connected to the battens through a plurality of angled lines 19 and connected to the battens in any desirable manner.

It will appear from the foregoing that a multi-cell wing has been provided that is basically a series of airfoil shaped wind-socks placed side by side. The openings shown in the leading edge of the wing allows the wind to enter and supply rigidity and will vary depending upon whether the wing is to be used for captive flight or a free drop. The desired angle of suspension is predetermined and the suspension system is thusly adjusted. The suspension or shroud lines can be attached to a bar or other rigid member running along the same direction as the chord of the wing ribs and by manipulating the rigid member the attitude of the wing can be effectively controlled. The wing can be fabricated of any material or joined by any method to insure safety of operation. The wing can be used to provide for dependable suspension of scientific instruments when it is inconvenient to have helium or hydrogen for balloon inflation, and not practical to use a balloon and especially when winds are too high for captive balloons plus the cumbersome problem of carrying bottle gas with also added storage problems and other numerous hazards that a balloon offers.

The wing basically has no rigid member whatsoever and is an ideal vehicle for carrying antennas aboard ships and various parts of the world whenever a wind of ten miles per hour is blowing. The trailing opening 12 is provided to increase the efficiency of aerodynamics.

It will be apparent from the foregoing that a very novel multi-cell wing type aerial device has been provided. The device is simple in construction, is cheap to manufacture, is strong, durable and most effective for the purposes indicated.

It is to be understood that the invention is not limited to the precise construction shown, but that changes are contemplated as readily fall within the spirit of the invention as shall be determined by the scope of the subjoined claims.

I claim:

1. An aerial wing of airfoil shape, the wing having a canopy and a bottom closure for the wing, the wing being generally rectangular in shape, having a leading edge and a trailing edge, ribs disposed within the wing and conforming to the shape of the wing and with the ribs being equidistantly spaced and connected to the canopy and the bottom, the leading edge of the wing having an opening for its full length and the wing at its trailing edge being provided with a restricted opening for its full length, the ribs forming air flow channels whereby air flowing through the opening of a leading edge will pressurize the canopy and a plurality of wedge-shaped members attached to the bottom and along the chord lines of the ribs for connection to weight supporting shroud lines.

2. A wing type aerial device as provided for in claim 1 wherein the canopy, the bottom and the ribs are formed of flexible material.

3. A wing type aerial device as provided for in claim 2 wherein the opening upon the leading edge of the wing is relatively wide and the opening upon the trailing edge of the wing is relatively narrower and whereby air entering the opening of the leading edge will pressurize the wing to maintain the airfoil shape, the wedges being disposed upon the bottom of the wing along the chord lines of each of the ribs.

4. A wing type aerial device comprising a wing of generally rectangular shape and with the wing embodying a canopy and a bottom closure, a plurality of equidistantly spaced flexible ribs that are co-extensive in length with the canopy and the bottom, the ribs at their upper and lower edges being stitched to the canopy and the bottom, the wing at its leading edge being provided with a relatively wide opening for its full length and the wing at its trailing edge being provided with a restricted air escape opening for the full length of the wing, the several ribs forming a plurality of air flow channels and whereby air entering the opening of the leading edge will maintain the wing in an airfoil shape and with the bottom being flat, a plurality of wedges of textile material being stitched to the bottom along the chords of the several wedges, the wedges being depending from the bottom and connected at their points with shroud lines.

5. The structure according to claim 4 wherein the ends of the canopy are folded downwardly and stitched to the bottom to form the end channels for the wing.

6. The structure according to claim 1 wherein the opening for the leading edge of the wing is downwardly angled to provide an air inlet when the wing is used as a free drop and to collect the air into the wing during the descent of the wing.

7. A wing type aerial device of generally rectangular shape and with the wing being shaped longitudinally to conform to an airfoil, the wing having an upper canopy of airfoil shape and a lower closure sheet, all of flexible material, the wing being provided with a plurality of flexible wedge-shaped ribs that are equidistantly spaced and co-extensive with the width of the parachute, the ribs at their upper and lower marginal edges being fixedly connected to the canopy and the bottom sheet, the several ribs forming a plurality of air flow channels, the bottom sheet having a plurality of battens of relatively rigid form that are connected to the bottom sheet along the several chord lines of the ribs and a plurality of shroud lines connected to the battens at spaced apart points.

8. The structure according to claim 7 wherein the battens are disposed within textile tubing and with the marginal edges of the tubing being stitched to the bottom sheet.

No references cited.

MILTON BUCHLER, *Primary Examiner.*

ALFRED E. CORRIGAN, *Examiner.*